(12) United States Patent
Wang et al.

(10) Patent No.: US 10,230,990 B2
(45) Date of Patent: Mar. 12, 2019

(54) CHROMA INTERPOLATION METHOD AND FILTER DEVICE USING THE METHOD

(71) Applicant: PEKING UNIVERSITY SHENZHEN GRADUATE SCHOOL, Shenzhen (CN)

(72) Inventors: Ronggang Wang, Shenzhen (CN); Hao Lv, Shenzhen (CN); Zhenyu Wang, Shenzhen (CN); Shengfu Dong, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 357 days.

(21) Appl. No.: 15/059,266

(22) Filed: Mar. 2, 2016

(65) Prior Publication Data

US 2016/0182918 A1    Jun. 23, 2016

Related U.S. Application Data

(63) Continuation-in-part of application No. PCT/CN2014/074440, filed on Mar. 31, 2014.

(51) Int. Cl.
| | |
|---|---|
| *H04N 19/82* | (2014.01) |
| *H04N 19/523* | (2014.01) |
| *H04N 19/587* | (2014.01) |
| *H04N 19/117* | (2014.01) |
| *H04N 19/186* | (2014.01) |
| *H04N 19/182* | (2014.01) |
| *H04N 19/513* | (2014.01) |

(52) U.S. Cl.
CPC ............ *H04N 19/82* (2014.11); *H04N 19/117* (2014.11); *H04N 19/182* (2014.11); *H04N 19/186* (2014.11); *H04N 19/513* (2014.11); *H04N 19/523* (2014.11); *H04N 19/587* (2014.11)

(58) Field of Classification Search
CPC ..................................................... H04N 19/82
See application file for complete search history.

(56) References Cited

U.S. PATENT DOCUMENTS

| | | | | |
|---|---|---|---|---|
| 2013/0089144 | A1* | 4/2013 | Lee ...................... | H04N 19/463 375/240.12 |
| 2014/0105308 | A1* | 4/2014 | Matsuo ................. | H04N 19/82 375/240.16 |
| 2014/0314154 | A1* | 10/2014 | Chono ................. | H04N 19/523 375/240.16 |

* cited by examiner

*Primary Examiner* — James M Pontius
(74) *Attorney, Agent, or Firm* — Miles & Stockbridge PC

(57) ABSTRACT

A chroma interpolation method, including: 1) determining a pixel accuracy for interpolation; 2) determining coordinate positions of interpolated fractional-pel pixels between integer-pel pixels; and 3) performing two-dimensional separated interpolation on the interpolated fractional-pel pixels by an interpolation filter according to the coordinate positions. The invention also provides a filter device using the above method for chroma interpolation.

21 Claims, 3 Drawing Sheets

CHROMA INTERPOLATION METHOD AND FILTER DEVICE USING THE METHOD

CROSS-REFERENCE TO RELATED APPLICATIONS

This application is a continuation-in-part of International Patent Application No. PCT/CN2014/074440 with an international filing date of Mar. 31, 2014, designating the United States, now pending. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the field of the video codec technology, and more particularly to a chroma interpolation method and a filter device using the same for chroma interpolation.

Description of the Related Art

Typical video codec standards adopt luma interpolation which has a 1/4-pel accuracy. The corresponding chroma interpolation has a 1/8-pel accuracy, with the interpolated fractional-pel pixels reaching 63; this increases the calculation difficulty.

Although bilinear interpolation features a simple calculation process, the performance thereof is inadequate.

SUMMARY OF THE INVENTION

In view of the above-described problems, it is one objective of the invention to provide an improved chroma interpolation method and a filter device using the method.

To achieve the above objective, in accordance with one embodiment of the invention, there is provided a chroma interpolation method. The method comprises:
1) determining a pixel accuracy for interpolation;
2) determining coordinate positions of interpolated fractional-pel pixels between integer-pel pixels; and
3) performing two-dimensional separated interpolation on the interpolated fractional-pel pixels by an interpolation filter according to the coordinate positions.

In a class of this embodiment, the pixel accuracy is 1/8-pel accuracy. The interpolation filter comprises a 4-tap interpolation filter.

In a class of this embodiment, the two-dimensional separated interpolation on the interpolated fractional-pel pixels according to the coordinate positions comprises:
1) performing one-dimensional interpolation filtering on the fractional-pel pixels between adjacent integer-pel pixels in a horizontal direction;
2) performing one-dimensional interpolation filtering on the factional-pel pixels between adjacent integer-pel pixels in a vertical direction; and
3) performing the one-dimensional interpolation filtering on remaining factional-pel pixels in the horizontal direction and then performing the one-dimensional interpolation filtering in the vertical direction.

In a class of this embodiment, coefficients of the 4-tap interpolation filter are as follows: a coefficient corresponding to a 1/8-pel is $\{-4, 62, 6, 0\}$; a coefficient corresponding to a 2/8-pel is $\{-6, 56, 15, -1\}$; a coefficient corresponding to a 3/8-pel is $\{-5, 47, 25, -3\}$; a coefficient corresponding to a 4/8-pel is $\{-4, 36, 36, -4\}$; a coefficient corresponding to a 5/8-pel is $\{-3, 25, 47, -5\}$; a coefficient corresponding to a 6/8-pel is $\{-1, 15, 56, -6\}$; and a coefficient corresponding to a 7/8-pel is $\{0, 6, 62, -4\}$.

In a class of this embodiment, the coordinate positions of the interpolated fractional-pel pixels are as follows:

| | X | | | | | | | |
|---|---|---|---|---|---|---|---|---|
| Y | 0/8 | 1/8 | 2/8 | 3/8 | 4/8 | 5/8 | 6/8 | 7/8 |
| 0/8 | A | oa | ob | oc | od | oe | of | og |
| 1/8 | pa | pb | pc | pd | pe | pf | pg | ph |
| 2/8 | qa | qb | qc | qd | qe | qf | qg | qh |
| 3/8 | ra | rb | rc | rd | re | rf | rg | rh |
| 4/8 | sa | sb | sc | sd | se | sf | sg | sh |
| 5/8 | ta | tb | tc | td | te | tf | tg | th |
| 6/8 | ua | ub | uc | ud | ue | uf | ug | uh |
| 7/8 | va | vb | vc | vd | ve | vf | vg | vh | in which, interpolation processes of the fractional-pel pixels oa, ob, oc, od, oe, of, and og are as follows: performing 4-tap interpolation filter on the adjacent integer-pel pixels in the horizontal direction, adopting the coefficients of the interpolation filter corresponding to the 1/8-pel, 2/8-pel, 3/8-pel, 4/8-pel, 5/8-pel, 6/8-pel, 7/8-pel positions for calculation, and shifting calculation results by shift1 to acquire corresponding fractional-pel pixels.

In a class of this embodiment, interpolation processes of the fractional-pel pixels pa, qa, ra, sa, ta, ua, and va are as follows: performing 4-tap interpolation filter on the adjacent integer-pel pixels in the vertical direction, adopting the coefficients of the interpolation filter corresponding to the 1/8-pel, 2/8-pel, 3/8-pel, 4/8-pel, 5/8-pel, 6/8-pel, 7/8-pel positions for calculation, and shifting calculation results by shift1 to acquire corresponding fractional-pel pixels.

In a class of this embodiment, shift1 equals to 6.

In a class of this embodiment, interpolation processes of the remaining fractional-pel pixels are as follows: performing 4-tap interpolation filter on the adjacent integer-pel pixels in the horizontal direction, adopting coefficients of the interpolation filter corresponding to the positions of the remaining fractional-pel pixels to acquire intermediate values; and performing 4-tap interpolation filter on the intermediate values in the vertical direction, and adopting the coefficients of the interpolation filter corresponding to the 1/8-pel, 2/8-pel, 3/8-pel, 4/8-pel, 5/8-pel, 6/8-pel, 7/8-pel positions for calculation, and shifting calculation results by shift2 to acquire corresponding fractional-pel pixels.

In a class of this embodiment, shift2 equals to 12.

In accordance with another embodiment of the invention, there is provided a filter device using the above method for chroma interpolation.

Advantages of the chroma interpolation method according to embodiments of the invention are summarized as follows.

Because the coordinate positions of the interpolated fractional-pel pixels between integer-pel pixels are determined, the two-dimensional separated interpolation can be performed on the interpolated fractional-pel pixels by the low tap interpolation filter, such as the 4-tap interpolation filter, according to the coordinate positions. For the bilinear interpolation, the performance of the interpolation is improved.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a chroma interpolation method and a filter device are described below. It should be noted that the following examples are intended to describe and not to limit the invention.

Figure 1:
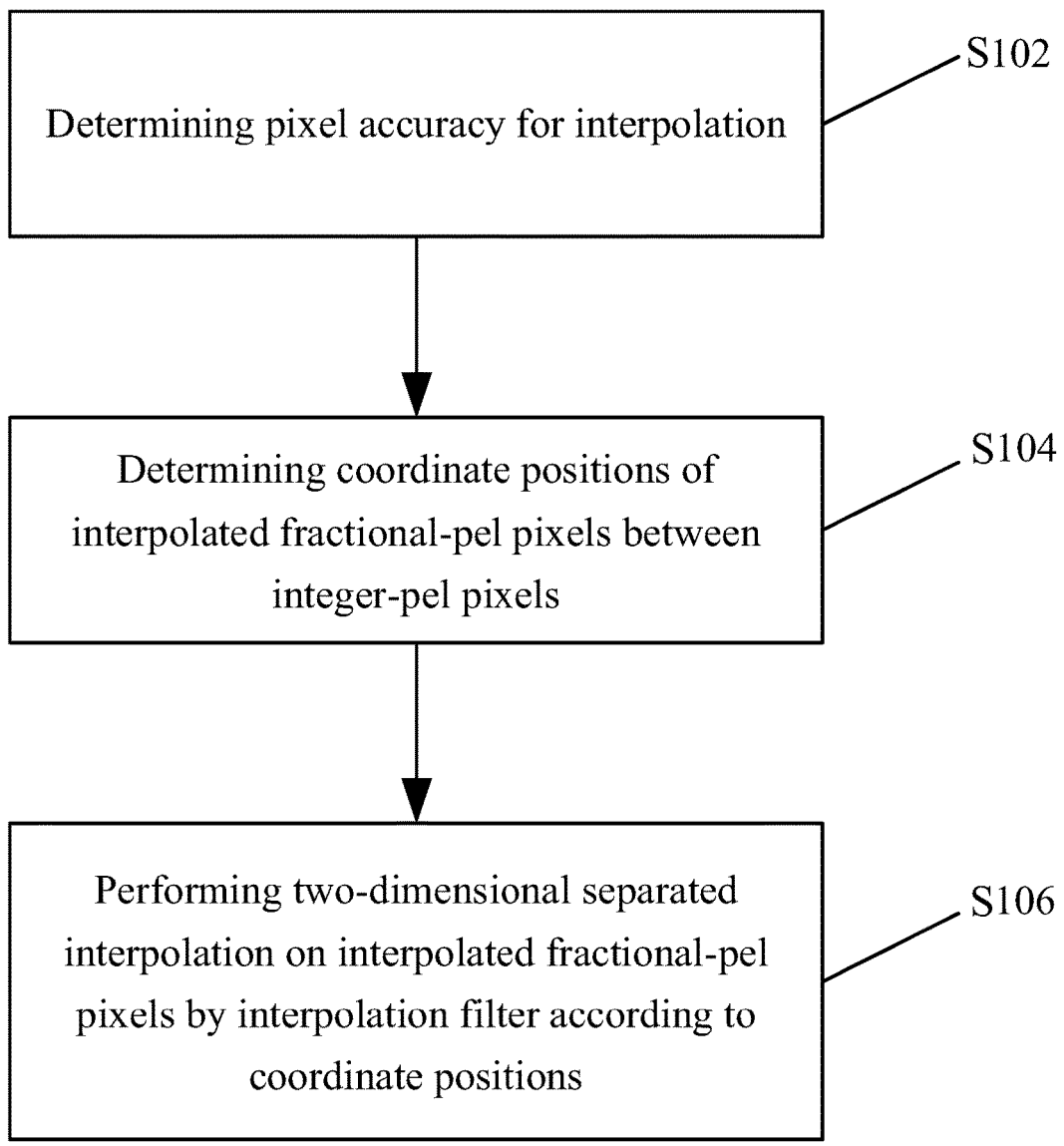
FIG. 1 is a first flow chart of a chroma interpolation method in accordance with one embodiment of the invention.

As show in FIG. 1, a chroma interpolation method in accordance with one embodiment of the invention, comprises the following steps:

S102: determining a pixel accuracy for interpolation. In one embodiment of the invention, the pixel accuracy is 1/8-pel accuracy.

S104: determining coordinate positions of interpolated fractional-pel pixels between integer-pel pixels;

S106: performing two-dimensional separated interpolation on the interpolated fractional-pel pixels by an interpolation filter according to the coordinate positions. In one embodiment of the invention, the interpolation filter comprises a 4-tap interpolation filter.

In one embodiment of the invention, the two-dimensional separated interpolation on the interpolated fractional-pel pixels according to the coordinate positions comprises:

1) performing one-dimensional interpolation filtering on the fractional-pel pixels between adjacent integer-pel pixels in a horizontal direction;

2) performing one-dimensional interpolation filtering on the factional-pel pixels between adjacent integer-pel pixels in a vertical direction; and 3) performing the one-dimensional interpolation filtering on remaining factional-pel pixels in the horizontal direction and then performing the one-dimensional interpolation filtering in the vertical direction.

In the chroma interpolation method of the invention, coefficients of the 4-tap interpolation filter are as follows: a coefficient corresponding to a 1/8-pel is $\{-4, 62, 6, 0\}$; a coefficient corresponding to a 2/8-pel is $\{-6, 56, 15, -1\}$; a coefficient corresponding to a 3/8-pel is $\{-5, 47, 25, -3\}$; a coefficient corresponding to a 4/8-pel is $\{-4, 36, 36, -4\}$; a coefficient corresponding to a 5/8-pel is $\{-3, 25, 47, -5\}$; a coefficient corresponding to a 6/8-pel is $\{-1, 15, 56, -6\}$; and a coefficient corresponding to a 7/8-pel is $\{0, 6, 62, -4\}$. The adopted coefficients of the 4-tap interpolation filter have excellent performance and good interpolation effect.

In the video codec standard, the motion vector of the chroma is derived from the motion vector searched by the luma. Since the motion vector of the luma generally adopted in the current standard has 1/4-pel accuracy, the motion vector of the chroma has 1/8-pel accuracy, thus the fractional-pel pixels of the chroma can be acquired by interpolation according to the motion vector of the chroma.

Figure 2:
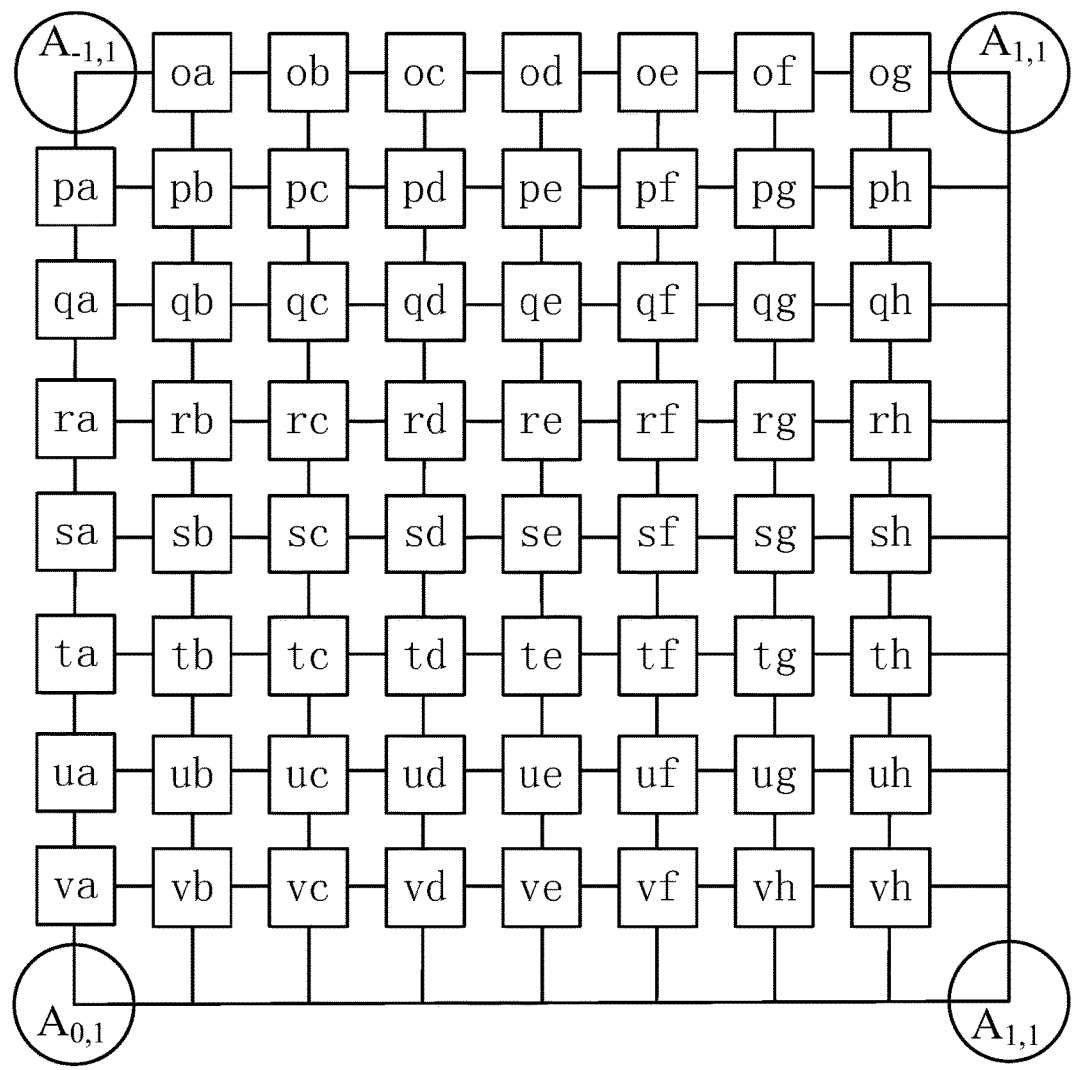
FIG. 2 is a structure diagram showing interpolated fractional-pel pixels in accordance with one embodiment of the invention.

In one embodiment of the chroma interpolation method of the invention, the interpolated fractional-pel pixels are shown in FIG. 2, in which, positions represented by upper-case letters are known integer integer-pel pixels, and positions represented by lower-case letters are fractional-pel pixels required to be acquired by interpolation. Fractional-pel pixels oa, ob, oc, od, oe, of, and og can be acquired by performing 4-tap interpolation filter on the adjacent integer-pel pixels in the horizontal direction. Fractional-pel pixels pa, qa, ra, sa, ta, ua, and va can be acquired by performing 4-tap interpolation filter on the adjacent integer-pel pixels in the vertical direction. And the remaining fractional-pel pixels can be acquired by performing 4-tap interpolation filter on the adjacent integer-pel pixels in the horizontal direction and then performing the 4-tap interpolation filter on intermediate values in the vertical direction. The coefficients of the 4-tap interpolation filter are listed in Table 1, and the coordinate positions of the interpolated fractional-pel pixels are listed in Table 2.

TABLE 1

Coefficients of 4-tap interpolation filter

| Positions of fractional-pel pixels | Coefficients of interpolation filter |
| --- | --- |
| 1/8 | $\{-4, 62, 6, 0\}$ |
| 2/8 | $\{-6, 56, 15, -1\}$ |
| 3/8 | $\{-5, 47, 25, -3\}$ |
| 4/8 | $\{-4, 36, 36, -4\}$ |
| 5/8 | $\{-3, 25, 47, -5\}$ |
| 6/8 | $\{-1, 15, 56, -6\}$ |
| 7/8 | $\{0, 6, 62, -4\}$ |

TABLE 2

Coordinate positions of interpolated fractional-pel pixels

| Y | X | | | | | | | |
| --- | --- | --- | --- | --- | --- | --- | --- | --- |
| | 0/8 | 1/8 | 2/8 | 3/8 | 4/8 | 5/8 | 6/8 | 7/8 |
| 0/8 | A | oa | ob | oc | od | oe | of | og |
| 1/8 | pa | pb | pc | pd | pe | pf | pg | ph |
| 2/8 | qa | qb | qc | qd | qe | qf | qg | qh |
| 3/8 | ra | rb | rc | rd | re | rf | rg | rh |
| 4/8 | sa | sb | sc | sd | se | sf | sg | sh |
| 5/8 | ta | tb | tc | td | te | tf | tg | th |
| 6/8 | ua | ub | uc | ud | ue | uf | ug | uh |
| 7/8 | va | vb | vc | vd | ve | vf | vg | vh |

Figure 3:
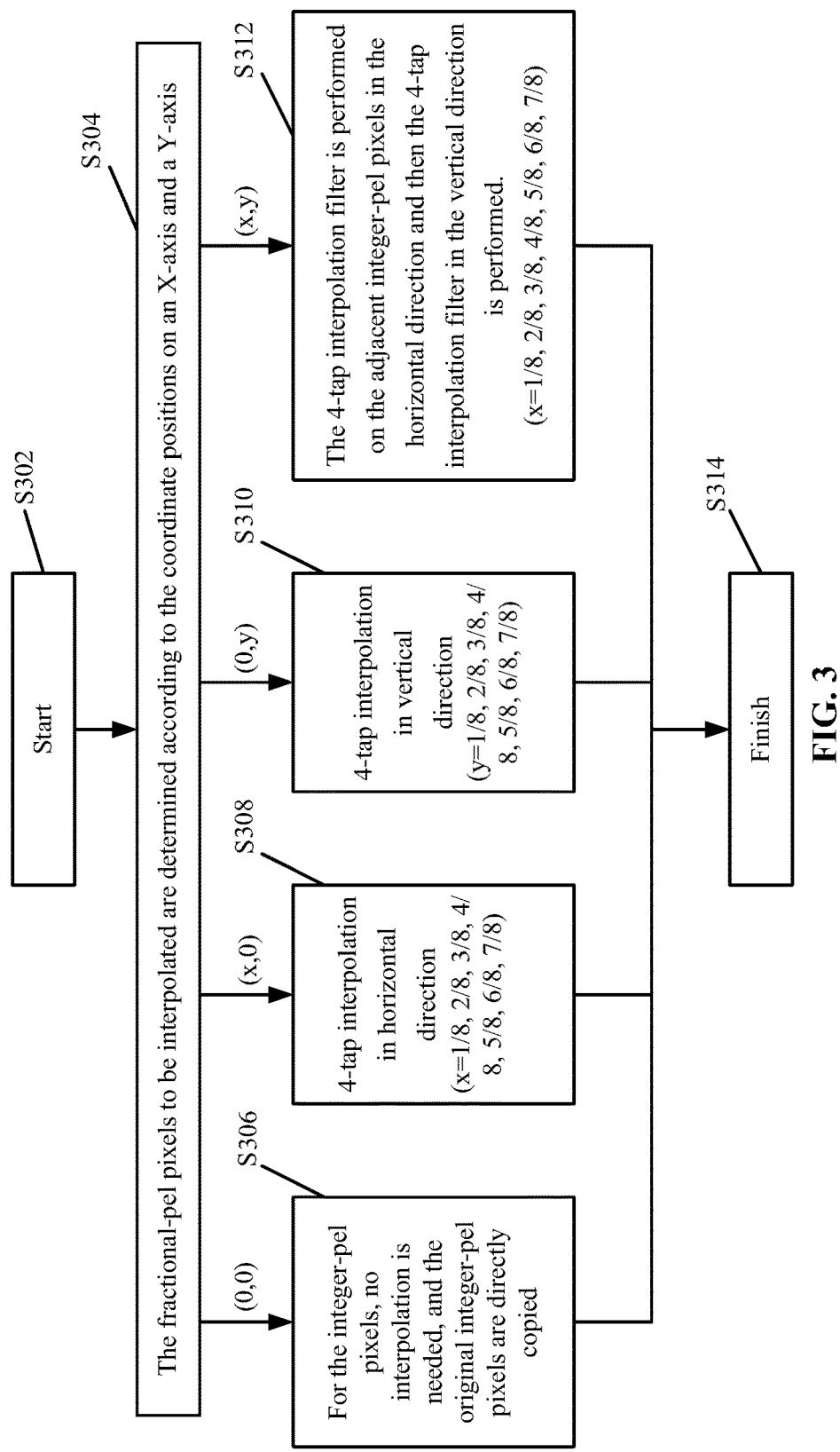
FIG. 3 is a second flow chart of a chroma interpolation method in accordance with one embodiment of the invention.

In another embodiment of the invention, the chroma interpolation, as shown in FIG. 3, comprises the following steps:

S302: start.

S304: the fractional-pel pixels to be interpolated are determined according to the coordinate positions on an X-axis and a Y-axis in Table 2, in which $0 \leq X \leq 7/8$, $0 \leq Y \leq 7/8$.

S306: for the integer-pel pixels, the original integer-pel pixels are directly copied. The interpolation processes of the corresponding fractional-pel pixels are respectively performed according to the determination of the above step. For the integer-pel pixels, no interpolation is needed, and the original integer-pel pixels are directly copied.

S308: interpolation processes of pixels having the Y-axis equal to 0, such as the fractional-pel pixels oa, ob, oc, od, oe, of, and og, are as follows: the 4-tap interpolation filter is performed on the adjacent integer-pel pixels in the horizontal direction, and the coefficients of the interpolation filter corresponding to the 1/8-pel, 2/8-pel, 3/8-pel, 4/8-pel, 5/8-pel, 6/8-pel, 7/8-pel positions are adopted to calculate the corresponding fractional-pel pixels. Specific calculation equations corresponding to the fractional-pel pixels oa, ob, oc, od, oe, of, and og are as follows:

$$oa = (-4 \times A_{-1,0} + 62 \times A_{0,0} + 6 \times A_{1,0}) >> \text{shift1}$$

$ob=(-6 \times A_{-1,0}+56 \times A_{0,0}+15 \times A_{1,0}-A_{2,0})>>shift1$ $oc=(-5 \times A_{-1,0}+47 \times A_{0,0}+25 \times A_{1,0}-3 \times A_{2,0})>>shift1$ $od=(-4 \times A_{-1,0}+36 \times A_{0,0}+36 \times A_{1,0}-4 \times A_{2,0})>>shift1$ $oe=(-3 \times A_{-1,0}+25 \times A_{0,0}+47 \times A_{1,0}-5 \times A_{2,0})>>shift1$ $of=(-A_{-1,0}+15 \times A_{0,0}+56 \times A_{1,0}-6 \times A_{2,0})>>shift1$ $og=(6 \times A_{0,0}+62 \times A_{1,0}-4 \times A_{2,0})>>shift1$ S310: interpolation processes of pixels having the X-axis equal to 0, such as the fractional-pel pixels pa, qa, ra, sa, ta, ua, and va, are as follows: the 4-tap interpolation filter is performed on the adjacent integer-pel pixels in the vertical direction, and the coefficients of the interpolation filter corresponding to the 1/8-pel, 2/8-pel, 3/8-pel, 4/8-pel, 5/8-pel, 6/8-pel, 7/8-pel positions are adopted to calculate the corresponding fractional-pel pixels. Specific calculation equations corresponding to the fractional-pel pixels pa, qa, ra, sa, ta, ua, and va are as follows:

$pa=(-4 \times A_{0,-1}+62 \times A_{0,0}+6 \times A_{0,1})>>shift1$ $qa=(-6 \times A_{0,-1}+56 \times A_{0,0}+15 \times A_{0,1}-A_{0,2})>>shift1$ $ra=(-5 \times A_{0,-1}+47 \times A_{0,0}+25 \times A_{0,1}-3 \times A_{0,2})>>shift1$ $sa=(-4 \times A_{0,-1}+36 \times A_{0,0}+36 \times A_{0,1}-4 \times A_{0,2})>>shift1$ $ta=(-3 \times A_{0,-1}+25 \times A_{0,0}+47 \times A_{0,1}-5 \times A_{0,2})>>shift1$ $ua=(-A_{0,-1}+15 \times A_{0,0}+56 \times A_{0,1}-6 \times A_{0,2})>>shift1$ $va=(6 \times A_{0,0}+62 \times A_{0,1}-4 \times A_{0,2})>>shift1$ S312: for the remaining fractional-pel pixels, the 4-tap interpolation filter is performed on the adjacent integer-pel pixels in the horizontal direction and then the 4-tap interpolation filter in the vertical direction is performed.

Interpolation processes of the fractional-pel pixels pb, qb, rb, sb, tb, ub, and vb are as follows: the 4-tap interpolation filter is performed on the adjacent integer-pel pixels in the horizontal direction, and the coefficients of the interpolation filter at corresponding positions are utilized, so that intermediate values $oa'_{0,i}$ (in which i represents integers between −1 and 2) are obtained. A difference between oa' and oa is that the calculation of oa' is in the absence of the final shifting operation by shift1. Then, the 4-tap interpolation filter is performed on the intermediate values $oa'_{0,i}$ in the vertical direction, and the coefficients of the interpolation filter corresponding to the 1/8-pel, 2/8-pel, 3/8-pel, 4/8-pel, 5/8-pel, 6/8-pel, 7/8-pel positions are adopted respectively to calculate the corresponding fractional-pel pixels. Hereinbelow, the calculation equations of the fractional-pel pixels pb and qbare listed while calculation equations of other fraction-pel pixels are likewise:

$pb=(-4 \times oa'_{0,-1}+62 \times oa'_{0,0}+6 \times oa'_{0,1})>>shift2$ $pb=(-6 \times oa'_{0,-1}+56 \times oa'_{0,0}+15 \times oa'_{0,1}-oa'_{0,2})>>shift2$ Interpolation processes of the fractional-pel pixels pc, qc, rc, sc, tc, uc, and vc are as follows: the 4-tap interpolation filter is performed on the adjacent integer-pel pixels in the horizontal direction, and the coefficients of the interpolation filter at corresponding positions are utilized, so that intermediate values $ob'_{0,i}$ (in which i represents integers between −1 and 2) are obtained. A difference between ob' and ob is that the calculation of ob' is in the absence of the final shifting operation by shift1. Then, the 4-tap interpolation filter is performed on the intermediate values $ob'_{0,i}$ in the vertical direction, and the coefficients of the interpolation filter corresponding to the 1/8-pel, 2/8-pel, 3/8-pel, 4/8-pel, 5/8-pel, 6/8-pel, 7/8-pel positions are adopted respectively to calculate the corresponding fractional-pel pixels. Hereinbelow, the calculation equations of the fractional-pel pixels pc and qc are listed while calculation equations of other fraction-pel pixels are likewise:

$pc=(-4 \times ob'_{0,-1}+62 \times ob'_{0,0}+6 \times ob'_{0,1})>>shift2$ $qc=(-6 \times ob'_{0,-1}+56 \times ob'_{0,0}+15 \times ob'_{0,1}-ob'_{0,2})>>shift2$ Interpolation processes of the fractional-pel pixels pd, qd, rd, sd, td, ud, and vd are as follows: the 4-tap interpolation filter is performed on the adjacent integer-pel pixels in the horizontal direction, and the coefficients of the interpolation filter at corresponding positions are utilized, so that intermediate values $oc'_{0,i}$ (in which i represents integers between −1 and 2) are obtained. A difference between oc' and oc is that the calculation of oc' is in the absence of the final shifting operation by shift1. Then, the 4-tap interpolation filter is performed on the intermediate values $oc'_{0,i}$ in the vertical direction, and the coefficients of the interpolation filter corresponding to the 1/8-pel, 2/8-pel, 3/8-pel, 4/8-pel, 5/8-pel, 6/8-pel, 7/8-pel positions are adopted respectively to calculate the corresponding fractional-pel pixels. Hereinbelow, the calculation equations of the fractional-pel pixels pd and qdare listed while calculation equations of other fraction-pel pixels are likewise:

$pd=(-4 \times oc'_{0,-1}+62 \times oc'_{0,0}+6 \times oc'_{0,1})>>shift2$ $qd=(-6 \times oc'_{0,-1}+56 \times oc'_{0,0}+15 \times oc'_{0,1}-oc'_{0,2})>>shift2$ Interpolation processes of the fractional-pel pixels pe, qe, re, se, te, ue, and ye are as follows: the 4-tap interpolation filter is performed on the adjacent integer-pel pixels in the horizontal direction, and the coefficients of the interpolation filter at corresponding positions are utilized, so that intermediate values $od'_{0,i}$ (in which i represents integers between −1 and 2) are obtained. A difference between od' and od is that the calculation of od' is in the absence of the final shifting operation by shift1. Then, the 4-tap interpolation filter is performed on the intermediate values $od'_{0,i}$ in the vertical direction, and the coefficients of the interpolation filter corresponding to the 1/8-pel, 2/8-pel, 3/8-pel, 4/8-pel, 5/8-pel, 6/8-pel, 7/8-pel positions are adopted respectively to calculate the corresponding fractional-pel pixels. Hereinbelow, the calculation equations of the fractional-pel pixels pe and qe are listed while calculation equations of other fraction-pel pixels are likewise:

$pe=(-4 \times od'_{0,-1}+62 \times od'_{0,0}+6 \times od'_{0,1})>>shift2$ $qe=(-6 \times od'_{0,-1}+56 \times +od'_{0,0}+15 \times od'_{0,1}-od'_{0,2})>>shift2$ Interpolation processes of the fractional-pel pixels pf, qf, rf, sf, tf, uf, and of are as follows: the 4-tap interpolation filter is performed on the adjacent integer-pel pixels in the horizontal direction, and the coefficients of the interpolation filter at corresponding positions are utilized, so that intermediate values $oe'_{0,i}$ (in which i represents integers between −1 and 2) are obtained. A difference between oe' and oe is that the calculation of oe' is in the absence of the final shifting operation by shift1. Then, the 4-tap interpolation filter is performed on the intermediate values $oe'_{0,i}$ in the vertical direction, and the coefficients of the interpolation filter corresponding to the 1/8-pel, 2/8-pel, 3/8-pel, 4/8-pel, 5/8-pel, 6/8-pel, 7/8-pel positions are adopted respectively to calculate the corresponding fractional-pel pixels. Hereinbelow, the calculation equations of the fractional-pel pixels pf and qf are listed while calculation equations of other fraction-pel pixels are likewise:

$$pf=(-4\times oe_{0,-1}+62\times oe'_{0,0}+6\times oe'_{0,1})>>shift2$$

$$qf=(-6\times oe'_{0,-1}+56\times oe'_{0,0}+15\times oe'_{0,1}-oe'_{0,2})>>shift2$$

Interpolation processes of the fractional-pel pixels pg, qg, rg, sg, tg, ug, and vg are as follows: the 4-tap interpolation filter is performed on the adjacent integer-pel pixels in the horizontal direction, and the coefficients of the interpolation filter at corresponding positions are utilized, so that intermediate values of $'_{0,i}$ (in which i represents integers between −1 and 2) are obtained. A difference between of and of is that the calculation of of is in the absence of the final shifting operation by shift1. Then, the 4-tap interpolation filter is performed on the intermediate values of $'_{0,i}$ in the vertical direction, and the coefficients of the interpolation filter corresponding to the 1/8-pel, 2/8-pel, 3/8-pel, 4/8-pel, 5/8-pel, 6/8-pel, 7/8-pel positions are adopted respectively to calculate the corresponding fractional-pel pixels. Hereinbelow, the calculation equations of the fractional-pel pixels pg and qg are listed while calculation equations of other fraction-pel pixels are likewise:

$$pg=(-4\times of'_{0,-1}+62\times of'_{0,0}+6\times of'_{0,1})>>shift2$$

$$qg=(-6\times of'_{0,-1}+56\times of'_{0,0}+15\times of'_{0,1}-of'_{0,2})>>shift2$$

Interpolation processes of the fractional-pel pixels ph, qh, rh, sh, th, uh, and vh are as follows: the 4-tap interpolation filter is performed on the adjacent integer-pel pixels in the horizontal direction, and the coefficients of the interpolation filter at corresponding positions are utilized, so that intermediate values $og'_{0,i}$ (in which i represents integers between −1 and 2) are obtained. A difference between og' and og is that the calculation of og' is in the absence of the final shifting operation by shift1. Then, the 4-tap interpolation filter is performed on the intermediate values $og'_{0,i}$ in the vertical direction, and the coefficients of the interpolation filter corresponding to the 1/8-pel, 2/8-pel, 3/8-pel, 4/8-pel, 5/8-pel, 6/8-pel, 7/8-pel positions are adopted respectively to calculate the corresponding fractional-pel pixels. Hereinbelow, the calculation equations of the fractional-pel pixels ph and qh are listed while calculation equations of other fraction-pel pixels are likewise:

$$ph=(-4\times og'_{0,-1}+62\times og'_{0,0}+6\times og'_{0,1})>>shift2$$

$$qh=(-6\times og'_{0,-1}+56\times og'_{0,0}+15\times og'_{0,1}-og'_{0,2})>>shift2$$

In the above equations, shift1=6 and shift2=12. Thus, the interpolated fractional-pel pixels are acquired by interpolation.

S314: Finish.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A chroma interpolation method, comprising:
  a) determining a pixel accuracy for interpolation;
  b) determining coordinate positions of interpolated fractional-pel pixels between integer-pel pixels; and
  c) performing two-dimensional separated interpolation on the interpolated fractional-pel pixels by an interpolation filter according to the coordinate positions of interpolated fractional-pel pixels between integer-pel pixels;
  wherein the two-dimensional separated interpolation on the interpolated fractional-pel pixels comprises:
    performing a first one-dimensional interpolation filtering on the interpolated fractional-pel pixels between adjacent integer-pel pixels in a horizontal direction;
    performing a second one-dimensional interpolation filtering on the interpolated fractional-pel pixels between adjacent integer-pel pixels in a vertical direction; and
    performing the first one-dimensional interpolation filtering on remaining interpolated fractional-pel pixels in the horizontal direction and then performing the second one-dimensional interpolation filtering on remaining interpolated fractional-pel pixels in the vertical direction.

2. The method of claim 1, wherein the pixel accuracy is 1/8-pel accuracy.

3. The method of claim 2, wherein the interpolation filter comprises a 4-tap interpolation filter.

4. The method of claim 3, wherein coefficients of the 4-tap interpolation filter are as follows:
  a coefficient corresponding to a 1/8-pel is {−4, 62, 6, 0};
  a coefficient corresponding to a 2/8-pel is {−6, 56, 15, −1};
  a coefficient corresponding to a 3/8-pel is {−5, 47, 25, −3};
  a coefficient corresponding to a 4/8-pel is {−4, 36, 36, −4};
  a coefficient corresponding to a 5/8-pel is {−3, 25, 47, −5};
  a coefficient corresponding to a 6/8-pel is {−1, 15, 56, −6}; and
  a coefficient corresponding to a 7/8-pel is {0, 6, 62, −4}.

5. The method of claim 4, wherein the coordinate positions of the interpolated fractional-pel pixels are as follows:

| | X | | | | | | | |
|---|---|---|---|---|---|---|---|---|
| Y | 0/8 | 1/8 | 2/8 | 3/8 | 4/8 | 5/8 | 6/8 | 7/8 |
| 0/8 | A | oa | ob | oc | od | oe | of | og |
| 1/8 | pa | pb | pc | pd | pe | pf | pg | ph |
| 2/8 | qa | qb | qc | qd | qe | qf | qg | qh |
| 3/8 | ra | rb | rc | rd | re | rf | rg | rh |
| 4/8 | sa | sb | sc | sd | se | sf | sg | sh |
| 5/8 | ta | tb | tc | td | te | tf | tg | th |
| 6/8 | ua | ub | uc | ud | ue | uf | ug | uh |
| 7/8 | va | vb | vc | vd | ve | vf | vg | vh | in which, interpolation processes of the fractional-pel pixels oa, ob, oc, od, oe, of, and og are as follows: performing 4-tap interpolation filter on the adjacent integer-pel pixels in the horizontal direction, adopting the coefficients of the interpolation filter corresponding to the 1/8-pel, 2/8-pel, 3/8-pel, 4/8-pel, 5/8-pel, 6/8pel, 7/8-pel positions for calculation, and shifting calculation results by shift1 to acquire corresponding fractional-pel pixels.

6. The method of claim 5, wherein interpolation processes of the fractional-pel pixels pa, qa, ra, sa, ta, ua, and va are as follows: performing 4-tap interpolation filter on the adjacent integer-pel pixels in the vertical direction, adopting the coefficients of the interpolation filter corresponding to the 1/8-pel, 2/8-pel, 3/8pel, 4/8-pel, 5/8-pel, 6/8-pel, 7/8-pel positions for calculation, and shifting calculation results by shift1 to acquire corresponding fractional-pel pixels.

7. The method of claim 6, wherein the shift1 equals to 6.

8. The method of claim 5, wherein interpolation processes of the remaining fractional-pel pixels are as follows: performing 4-tap interpolation filter on the adjacent integer-pel pixels in the horizontal direction, adopting coefficients of the interpolation filter corresponding to the coordinate positions of the remaining interpolated fractional-pel pixels to acquire intermediate values; and performing 4-tap interpolation filter on the intermediate values in the vertical direction, and adopting the coefficients of the interpolation filter corresponding to the 1/8-pel, 2/8-pel, 3/8-pel, 4/8-pel, 5/8-pel, 6/8-pel, 7/8-pel positions for calculation, and shifting calculation results by shift2 to acquire corresponding fractional-pel pixels.

9. The method of claim 8, wherein the shift2 equals to 12.

10. A system comprising:
a digital interpolation filter configured to perform two-dimensional separated interpolation on interpolated fractional-pel pixels according to determined coordinate positions of interpolated fraction-pel pixels between adjacent integer-pel pixels;
wherein a pixel accuracy for the two-dimensional separated interpolation is determined;
wherein the two-dimensional separated interpolation on the interpolated fractional-pel pixels comprise:
performing a first one-dimensional interpolation filtering on the interpolated fractional-pel pixels between adjacent integer-pel pixels in a horizontal direction;
performing a second one-dimensional interpolation filtering on the interpolated fractional-pel pixels between adjacent integer-pel pixels in a vertical direction; and
performing the first one-dimensional interpolation filtering on remaining interpolated fractional-pel pixels in the horizontal direction and then performing the second one-dimensional interpolation filtering on remaining interpolated fractional-pel pixels in the vertical direction.

11. The system of claim 10, wherein the pixel accuracy is 1/8-pel accuracy.

12. The system of claim 11, wherein the digital interpolation filter is a 4-tap interpolation filter.

13. The system of claim 12, wherein the 4-tap interpolation filter adopts coefficients as follows:
a coefficient corresponding to a 1/8-pel is {−4, 62, 6, 0};
a coefficient corresponding to a 2/8-pel is {−6, 56, 15, −1};
a coefficient corresponding to a 3/8-pel is {−5, 47, 25, −3};
a coefficient corresponding to a 4/8-pel is {−4, 36, 36, −4};
a coefficient corresponding to a 5/8-pel is {−3, 25, 47, −5};
a coefficient corresponding to a 6/8-pel is {−1, 15, 56, −6}; and
a coefficient corresponding to a 7/8-pel is {0, 6, 62, −4}.

14. The system of claim 13, wherein the coordinate positions of the interpolated fractional-pel pixels are as follows:

| Y | X | | | | | | | |
|---|---|---|---|---|---|---|---|---|
|   | 0/8 | 1/8 | 2/8 | 3/8 | 4/8 | 5/8 | 6/8 | 7/8 |
| 0/8 | A | oa | ob | oc | od | oe | of | og |
| 1/8 | pa | pb | pc | pd | pe | pf | pg | ph |
| 2/8 | qa | qb | qc | qd | qe | qf | qg | qh |
| 3/8 | ra | rb | rc | rd | re | rf | rg | rh |
| 4/8 | sa | sb | sc | sd | se | sf | sg | sh |
| 5/8 | ta | tb | tc | td | te | tf | tg | th |
| 6/8 | ua | ub | uc | ud | ue | uf | ug | uh |
| 7/8 | va | vb | vc | vd | ve | vf | vg | vh | in which, interpolation processes of the fractional-pel pixels oa, ob, oc, od, oe, of, and og are as follows: performing 4-tap interpolation filtering on the adjacent integer-pel pixels in the horizontal direction, adopting the coefficients of the 4-tap interpolation filter corresponding to the 1/8-pel, 2/8-pel, 3/8-pel, 4/8-pel, 5/8-pel, 6/8-pel, 7/8-pel positions for calculation, and shifting calculation results by shift1 to acquire corresponding fractional-pel pixels.

15. The system of claim 14, wherein interpolation processes of the fractional-pel pixels pa, qa, ra, sa, ta, ua, and va are as follows: performing 4-tap interpolation filtering on the adjacent integer-pel pixels in the vertical direction, adopting the coefficients of the 4-tap interpolation filter corresponding to the 1/8-pel, 2/8-pel, 3/8-pel, 4/8-pel, 5/8-pel, 6/8-pel, 7/8-pel positions for calculation, and shifting calculation results by shift1 to acquire corresponding fractional-pel pixels.

16. The system of claim 15, wherein the shift1 equals to 6.

17. The system of claim 14, wherein interpolation processes of the remaining fractional-pel pixels are as follows: performing 4-tap interpolation filter on the adjacent integer-pel pixels in the horizontal direction, adopting coefficients of the 4-tap interpolation filter corresponding to coordinate positions of the remaining interpolated fractional-pel pixels to acquire intermediate values; and performing 4-tap interpolation filter on the intermediate values in the vertical direction, and adopting the coefficients of the 4-tap interpolation filter corresponding to the 1/8-pel, 2/8-pel, 3/8-pel, 4/8-pel, 5/8-pel, 6/8-pel, 7/8-pel positions for calculation, and shifting calculation results by shift2 to acquire corresponding fractional-pel pixels.

18. The system of claim 17, wherein the shift2 equals to 12.

19. A chroma interpolation method, comprising:
a) determining a pixel accuracy for interpolation;
b) determining coordinate positions of interpolated fractional-pel pixels between integer-pel pixels; and
c) performing two-dimensional separated interpolation on the interpolated fractional-pel pixels by an interpolation filter according to the coordinate positions of interpolated fractional-pel pixels between integer-pel pixels;
wherein the two-dimensional separated interpolation on the interpolated fractional-pel pixels comprises:
performing a first one-dimensional interpolation filtering on the interpolated fractional-pel pixels between adjacent integer-pel pixels in a horizontal direction;
performing a second one-dimensional interpolation filtering on the interpolated fractional-pel pixels between adjacent integer-pel pixels in a vertical direction; and
performing the first one-dimensional interpolation filtering on remaining interpolated fractional-pel pixels in the horizontal direction and then performing the second one-dimensional interpolation filtering on remaining interpolated fractional-pel pixels in the vertical direction;

wherein the pixel accuracy is 1/8-pel accuracy;

wherein the interpolation filter comprises a 4-tap interpolation filter; and wherein coefficients of the 4-tap interpolation filter are as follows:

a coefficient corresponding to a 1/8-pel is {−4, 62, 6, 0};

a coefficient corresponding to a 2/8-pel is {−6, 56, 15, −1};

a coefficient corresponding to a 3/8-pel is {−5, 47, 25, −3};

a coefficient corresponding to a 4/8-pel is {−4, 36, 36, −4};

a coefficient corresponding to a 5/8-pel is {−3, 25, 47, −5};

a coefficient corresponding to a 6/8-pel is {−1, 15, 56, −6}; and a coefficient corresponding to a 7/8-pel is {0, 6, 62, −4}.

20. The method of claim 19, wherein the coordinate positions of the interpolated fractional-pel pixels are as follows:

|     | X   |     |     |     |     |     |     |     |
| --- | --- | --- | --- | --- | --- | --- | --- | --- |
| Y   | 0/8 | 1/8 | 2/8 | 3/8 | 4/8 | 5/8 | 6/8 | 7/8 |
| 0/8 | A   | oa  | ob  | oc  | od  | oe  | of  | og  |
| 1/8 | pa  | pb  | pc  | pd  | pe  | pf  | pg  | ph  |
| 2/8 | qa  | qb  | qc  | qd  | qe  | qf  | qg  | qh  |
| 3/8 | ra  | rb  | rc  | rd  | re  | rf  | rg  | rh  |
| 4/8 | sa  | sb  | sc  | sd  | se  | sf  | sg  | sh  |
| 5/8 | ta  | tb  | tc  | td  | te  | tf  | tg  | th  |
| 6/8 | ua  | ub  | uc  | ud  | ue  | uf  | ug  | uh  |
| 7/8 | va  | vb  | vc  | vd  | ve  | vf  | vg  | vh  | wherein interpolation processes of the fractional-pel pixels oa, ob, oc, od, oe, of, and og are as follows: performing 4-tap interpolation filter on the adjacent integer-pel pixels in the horizontal direction; adopting the coefficients of the interpolation filter corresponding to the 1/8-pel, 2/8-pel, 3/8-pel, 4/8-pel, 5/8-pel, 6/8-pel, 7/8-pel positions for calculation; and shifting calculation results by shift1 to acquire corresponding fractional-pel pixels;

wherein interpolation processes of the fractional-pel pixels pa, qa, ra, sa, ta, ua, and va are as follows: performing 4-tap interpolation filter on the adjacent integer-pel pixels in the vertical direction; adopting the coefficients of the interpolation filter corresponding to the 1/8-pel, 2/8-pel, 3/8-pel, 4/8-pel, 5/8-pel, 6/8-pel, 7/8-pel positions for calculation; and shifting calculation results by shift1 to acquire corresponding fractional-pel pixels;

wherein interpolation processes of the remaining fractional-pel pixels are as follows: performing 4-tap interpolation filter on the adjacent integer-pel pixels in the horizontal direction, adopting coefficients of the interpolation filter corresponding to the coordinate positions of the remaining interpolated fractional-pel pixels to acquire intermediate values; performing 4-tap interpolation filter on the intermediate values in the vertical direction, adopting the coefficients of the interpolation filter corresponding to the 1/8-pel, 2/8-pel, 3/8-pel, 4/8-pel, 5/8-pel, 6/8-pel,7/8-pel positions for calculation; and shifting calculation results by shift2 to acquire corresponding fractional-pel pixels.

21. The method of claim 20, wherein the shift1 equals to 6 and the shift2 equals to 12.

* * * * *